(12) United States Patent
Oku et al.

(10) Patent No.: US 8,477,612 B2
(45) Date of Patent: Jul. 2, 2013

(54) DATA RELAY DEVICE AND DATA RELAY METHOD

(75) Inventors: Makoto Oku, Edogawa-ku (JP); Noriko Mizuguchi, Yokosuka (JP); Masayuki Tsuda, Shinagawa-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 248 days.

(21) Appl. No.: 12/934,891

(22) PCT Filed: Apr. 1, 2009

(86) PCT No.: PCT/JP2009/056820
§ 371 (c)(1),
(2), (4) Date: Dec. 13, 2010

(87) PCT Pub. No.: WO2009/123265
PCT Pub. Date: Oct. 8, 2009

(65) Prior Publication Data
US 2011/0090801 A1    Apr. 21, 2011

(30) Foreign Application Priority Data
Apr. 3, 2008 (JP) ................. 2008-097336

(51) Int. Cl.
*G01R 31/08* (2006.01)
*H04Q 7/00* (2006.01)

(52) U.S. Cl.
USPC ............... 370/230; 370/236; 370/328

(58) Field of Classification Search
None
See application file for complete search history.

(56) References Cited

U.S. PATENT DOCUMENTS

| 5,978,775 A | 11/1999 | Chen |
| 6,085,225 A | 7/2000 | Nakajima et al. |
| 6,240,091 B1 | 5/2001 | Ginzboorg et al. |
| 2006/0052083 A1 | 3/2006 | Choi et al. |
| 2007/0189219 A1* | 8/2007 | Navali et al. ............. 370/331 |

FOREIGN PATENT DOCUMENTS

| JP | 2 142245 | 5/1990 |
| JP | 10 70530 | 3/1998 |
| JP | 2000 49774 | 2/2000 |
| JP | 2000 124900 | 4/2000 |

(Continued)

OTHER PUBLICATIONS

International Search Report issued Jul. 7, 2009 in PCT/JP09/056820 filed Apr. 1, 2009.

(Continued)

*Primary Examiner* — Yemane Mesfin
*Assistant Examiner* — Christine Duong
(74) *Attorney, Agent, or Firm* — Oblon, Spivak, McClelland, Maier & Neustadt, L.L.P.

(57) ABSTRACT

An object of the invention is to provide a charging processing device and a charging processing method capable of performing an appropriate charging process even when a connectionless protocol, such as UDP, is used. Gateway units 101 and 106 transmit data transmitted between a mobile apparatus 300 and a server 400 to the mobile apparatus 300 or the server 400 as a transmission destination, and a charging processing unit 102 performs a charging process according to the amount of data transmitted by the gateway units 101 and 106. A detecting unit 103 detects whether response data is transmitted from the transmission destination. When the timer value of the time for which communication is not performed is more than a predetermined time and the detecting unit 103 does not detect the response data from the transmission destination, the control unit 104 may control the gateway unit 101 or 106 to stop the transmission process and control the charging processing unit 102 to stop the charging process.

3 Claims, 10 Drawing Sheets

FOREIGN PATENT DOCUMENTS

| | | |
|---|---|---|
| JP | 2001 512926 | 8/2001 |
| JP | 2007-189740 | 7/2007 |
| WO | WO 2004/086790 A1 | 10/2004 |
| WO | WO/2005/018170 * | 2/2005 |

OTHER PUBLICATIONS

International Preliminary Report on Patentability and Written Opinion issued Dec. 9, 2010, in PCT/JP2009/056820.

Office Action issued May 22, 2012 in Japanese Application No. 2010-505976 (With English Translation).

The Extended European Search Report issued May 21, 2012, in Application No. / Patent No. 09729181.9-2273731 PCT/JP2009056820.

First Notification of Office Action issued Aug. 31, 2012 in Chinese Patent Application No. 200980111785.7 (wit English translation).

* cited by examiner

Fig.4

| USER | PORT USED | UPSTREAM NON-COMMUNICATION TIME<br>CLEAR WHEN UPSTREAM COMMUNICATION IS PERFORMED THROUGH ANY PORT USED BY USER | DOWNSTREAM NON-COMMUNICATION TIME<br>CLEAR WHEN DOWNSTREAM COMMUNICATION IS PERFORMED THROUGH EACH PORT |
|---|---|---|---|
| USER1 | A | 5 | 10 |
|  | B | 5 | 2 |
|  | C | 5 | 40 |
|  | D | 5 | 62 |
| USER2 | E | 15 | 5 |
|  | F | 15 | 20 |
|  | G | 15 | 2 |

※60 DENOTES TIMER THAT MONITORS TIME FOR WHICH UPSTREAM COMMUNICATION AND DOWNSTREAM COMMUNICATION ARE NOT PERFORMED

DATA RELAY DEVICE AND DATA RELAY METHOD

TECHNICAL FIELD

The present invention relates to a data relay device and a data relay method for performing a charging process for data.

BACKGROUND ART

As a method of charging for packets transmitted in a network, when a device which is an actual charging point, transmitted or received packets, it is charged on the basis of amount of the packets transmitted or received. For example, PTL 1 discloses a technique in which a router that transmits or receives packets to or from a connectionless computer network has a charging information table that stores the number of packets and the number of bytes for each destination address and performs a charging process on the basis of the charging information table.

CITATION LIST

Patent Literature

[PTL 1] JP-A-2000-49774

SUMMARY OF INVENTION

Technical Problem

However, the method of simply performing a charging process on the basis of the amount of packet transmitted on the network as in the technique disclosed in PTL 1 has the following problems. That is, in an apparatus that can be moved outside the communication service area, such as a mobile apparatus, when the mobile apparatus is moved outside the communication service area, data does not reach the mobile apparatus even though the data is transmitted from the content server to the mobile apparatus. In this case, even though data does not reach the mobile apparatus, a charging process is performed.

In addition, when the port of the content server is closed, data does not reach the content server even though the data is transmitted from the mobile apparatus to the content server. In this case, even though data does not reach the content server, a charging process is performed.

Therefore, an inappropriate process whereby a charging process is performed even though data does not reach a designated destination is considered. A charging process may be performed after it is confirmed that a communication with a correspondent terminal is available. However, a connectionless protocol, such as UDP (User Data Protocol), does not have a control process for notifying that it is available for the communication with the correspondent terminal. Therefore, in general, the charging process is performed on the basis of the transmitted data. Therefore, in particular, the above-mentioned problems arise.

Therefore, an object of the invention is to provide a data relay device and a data relay method capable of performing an appropriate charging process even when a connectionless protocol, such as UDP, is used.

Solution to Problem

In order to achieve the object, according to an aspect of the invention, a data relay device includes: a transmitting means for transmitting data transmitted between a mobile apparatus and a server to the mobile apparatus or the server as a transmission destination; a charging processing means for performing a charging process according to the amount of data transmitted by the transmitting means; a detecting means for detecting whether response data is transmitted from the transmission destination of the transmitting means; a transmission stop means for stopping a transmission process of the transmitting means when the detecting means does not detect the response data from the transmission destination; and a charging stop means for stopping the charging process of the charging processing means when the detecting means does not detect the response data from the transmission destination.

According to the above-mentioned aspect, data transmitted between the mobile apparatus and the server is transmitted to the mobile apparatus or the server as a transmission destination, and a charging process is performed according to the amount of transmitted data. In addition, it is detected whether the response data from the transmission destination is transmitted. When the response data from the transmission destination is not detected, it is possible to stop the transmission process and the charging process. In this way, when communication is performed using a connectionless protocol, such as UDP, it is possible to check whether communication is available between the transmitter side and the receiver side and perform the charging process only when the mobile apparatus and the server are connected. Therefore, it is possible to achieve an appropriate charging process.

In the data relay device according to the above-mentioned aspect, when the response data is not detected within a predetermined period of time after the transmitting means starts the transmission process, the transmission stop means may stop the transmission process of the transmitting means. When the response data is not detected within the predetermined period of time after the transmitting means starts the transmission process, the charging stop means may stop the charging process of the charging processing means.

According to the above-mentioned structure, when the response data is not detected within the predetermined period of time after the transmission process starts, the transmission process and the charging process stop. Therefore, it is possible to accurately check the connection state.

The data relay device according to the above-mentioned aspect may further include a measuring means for measuring upstream non-communication time which is the time for which the response data from the mobile apparatus is not detected, and downstream non-communication time which is the time for which the response data from the server is not detected, for each port. When the detecting means does not detect the response data transmitted from the mobile apparatus through each port within the predetermined period of time, the measuring means stops a process of measuring the upstream communication time for all ports ensured by the mobile apparatus, the charging stop means stops the charging process of the charging processing means for data received through all ports after the predetermined period of time has elapsed, and the transmission stop means performs a process of closing all ports to stop the transmission process of the transmitting means. When the detecting means does not detect the response data transmitted from the server connected through one of all of the ensured ports within the predetermined period of time, the measuring means stops a process of measuring the downstream communication time for the one port, the charging stop means stops the charging process of the charging processing means for data received through the one port after the predetermined period of time has elapsed, and the transmission stop means performs a process of closing the one port to stop the transmission process of the transmitting means.

According to the above-mentioned structure, the upstream non-communication time and the downstream non-communication time are managed in the unit of a port. When data transmitted from the mobile apparatus in the upward direction is not detected, the process of measuring the upstream non-communication time for all ports and the charging process stop. When data transmitted from the server in the downward direction is not detected, the process of measuring the downstream non-communication time for the port connected to the server and the charging process stop. Therefore, it is possible to perform a process corresponding to the ensured port. For example, the upstream non-communication time indicates the state between a mobile apparatus and a proxy apparatus, and it is preferable to perform a stop process for all ports since the following situation does not occur in which one port is outside the communication service area and the other port is within the communication service area. In addition, the downstream non-communication time indicates the state between the proxy apparatus and the server connected to the proxy apparatus through one port through which downstream communication is performed. In some cases, even though the server connected through one port cannot perform communication due to, for example, a failure, the server may be connected through another port and perform communication. Therefore, in this case, management is performed such that a communication connection process and a charging process for the server connected through another port can be continuously performed.

However, the invention may be applied to the following data relay method in addition to the above-mentioned data relay device. The data relay method and the data relay device are substantially similar to each other except for the category and have the same operation and effect.

That is, according to another aspect of the invention, a data relay method includes: a transmitting steps of transmitting data transmitted between a mobile apparatus and a server to the mobile apparatus and the server as transmission destinations; a charging step of performing a charging process according to the amount of data transmitted in the transmitting step; a detecting step of detecting whether response data is transmitted from the transmission destination in the transmitting step; a transmission stop step of stopping a transmission process in the transmitting step when the response data from the transmission destination is not detected in the detecting step; and a charging stop step of stopping the charging process in the charging step when the response data from the transmission destination is not detected in the detecting step.

Advantageous Effects of Invention

According to the invention, when communication is performed using a connectionless protocol, such as UDP, it is possible to check whether communication is available between the transmitter side and the receiver side and it is possible to perform a charging process only when the transmitter side and the receiver side are connected. Therefore, it is possible to achieve an appropriate charging process.

BRIEF DESCRIPTION OF DRAWINGS

FIG. 4 is a diagram illustrating the timer management of a timer unit 105.

REFERENCE SIGNS LIST

Figure 1:
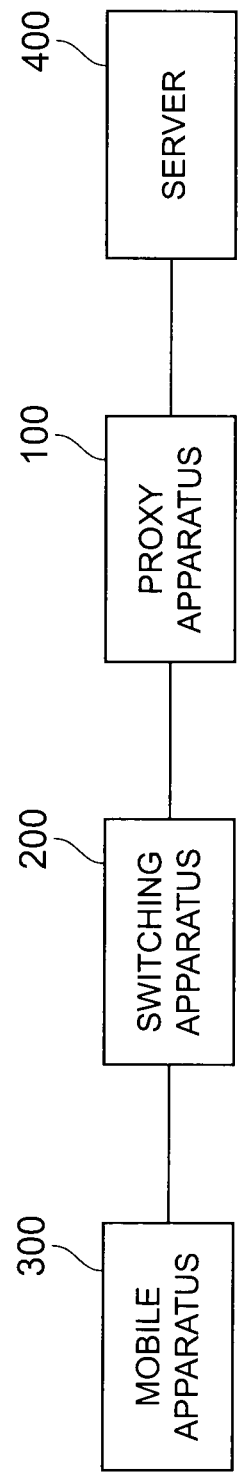
FIG. 1 is a diagram illustrating the structure of a communication system including a proxy apparatus 100 which is a data relay device according to an embodiment of the invention.

100: PROXY APPARATUS
101: GATEWAY UNIT
102: CHARGING PROCESSING UNIT
103: DETECTING UNIT
104: CONTROL UNIT
105: TIMER UNIT
106: GATEWAY UNIT
107: DETECTING UNIT
110: GATEWAY DEVICE
120: GATEWAY DEVICE
200: SWITCHING APPARATUS
300: MOBILE APPARATUS
400: SERVER

DESCRIPTION OF EMBODIMENTS

Hereinafter, an exemplary embodiment of the invention will be described with reference to the accompanying drawings. If possible, the same components are denoted by the same reference numerals and a description thereof will not be repeated.

FIG. 1 is a diagram illustrating the structure of a communication system including a proxy apparatus 100 which is a data relay device according to this embodiment. As shown in FIG. 1, the communication system includes the proxy apparatus 100, a switching apparatus 200, a mobile apparatus 300, and a server 400.

The proxy apparatus 100 is a data relay device for connecting the server 400 and the switching apparatus 200 and may transmit content data transmitted from the server 400 to the switching apparatus 200 in order to transmit it to the mobile apparatus 300. In addition, the proxy apparatus 100 may receive data transmitted from the mobile apparatus 300 through the switching apparatus 200 and transmit it to the server 400.

The switching apparatus 200 is arranged between the mobile apparatus 300 and the proxy apparatus 100 and performs a process of controlling the establishment or release of a call and a process of routing data from the mobile apparatus 300.

The mobile apparatus 300 is, for example, a mobile phone and may be connected to the switching apparatus 200 and the server 400 through a wireless communication network including, for example, a base station and RNC using a connectionless protocol (for example, UDP) so as to communicate with them. When receiving data from the server 400, it is preferable that the mobile apparatus 300 be configured so as to transmit response data to the server 400 at a predetermined time interval or whenever a predetermined amount of packet is received. In this way, the proxy apparatus 100 can check whether the communication of the mobile apparatus 300 is available. The mobile apparatus 300 may be an apparatus other than the mobile phone. Examples of the mobile apparatus include PDAs, PCs, home appliances, and game machines having a wireless communication function.

The server 400 is, for example, a server (hereinafter, referred to as a content provider) on the Internet provided by the content provider and distributes content data to the mobile apparatus 300 using the connectionless protocol (for example, UDP) according to the request from the mobile apparatus 300. The server 400 is not limited to the content provider, but may be, for example, a gateway server for connection to other communication networks, a LAN within a company, and a PC, a game machine, or a home appliance (a television and a DVD recorder) that may be connected to the Internet. In this case, the mobile apparatus 300 may communicate with the mobile apparatus that is connected to another communication network.

In the communication system having the above-mentioned structure, when the server 400 transmits data using a connectionless protocol, such as UDP, the proxy apparatus 100 performs a changing process according to the amount of data transmitted between the proxy apparatus 100 and the mobile apparatus 300 in order to levy a usage fee for the network and transmits the data to the switching apparatus 200. The switching apparatus 200 transmits the data to the mobile apparatus 300.

The proxy apparatus 100 detects whether the mobile apparatus 300 transmits response data to the data transmitted from the server 400. When the proxy apparatus 100 does not detect the response data within a predetermined period of time, the proxy apparatus 100 stops the charging process for the mobile apparatus 300 and closes the port such that data is not received from the server 400.

The response data is generated by an application of the mobile apparatus 300 and is then transmitted. For example, when content data is downloaded, the response data corresponds to a control signal that is transmitted to the server 400 at a predetermined time interval or for a predetermined number of bytes. Examples of the application include a browser, an application for executing VoIP, an on-line role-playing game, and a streaming reproducing player, such as a moving picture and music player. The response data may be generated by the operation of the user and then transmitted. Alternatively, the response data may be processed so as to be at least periodically transmitted to the server 400. The proxy apparatus 100 may detect the presence or absence of the response data and determine whether data from the server 400 is transmitted to the mobile apparatus 300 on the basis of the detection result.

Similarly, when data is transmitted from the mobile apparatus 300, the proxy apparatus 100 receives the data through the switching apparatus 200, performs the charging process, and transmits the data to the server 400. When the proxy server 100 does not detect that the server 400 has transmitted response data to the data transmitted from the mobile apparatus 300 within a predetermined amount of time, the proxy apparatus 100 stops the charging process for the mobile apparatus 300.

Figure 2:
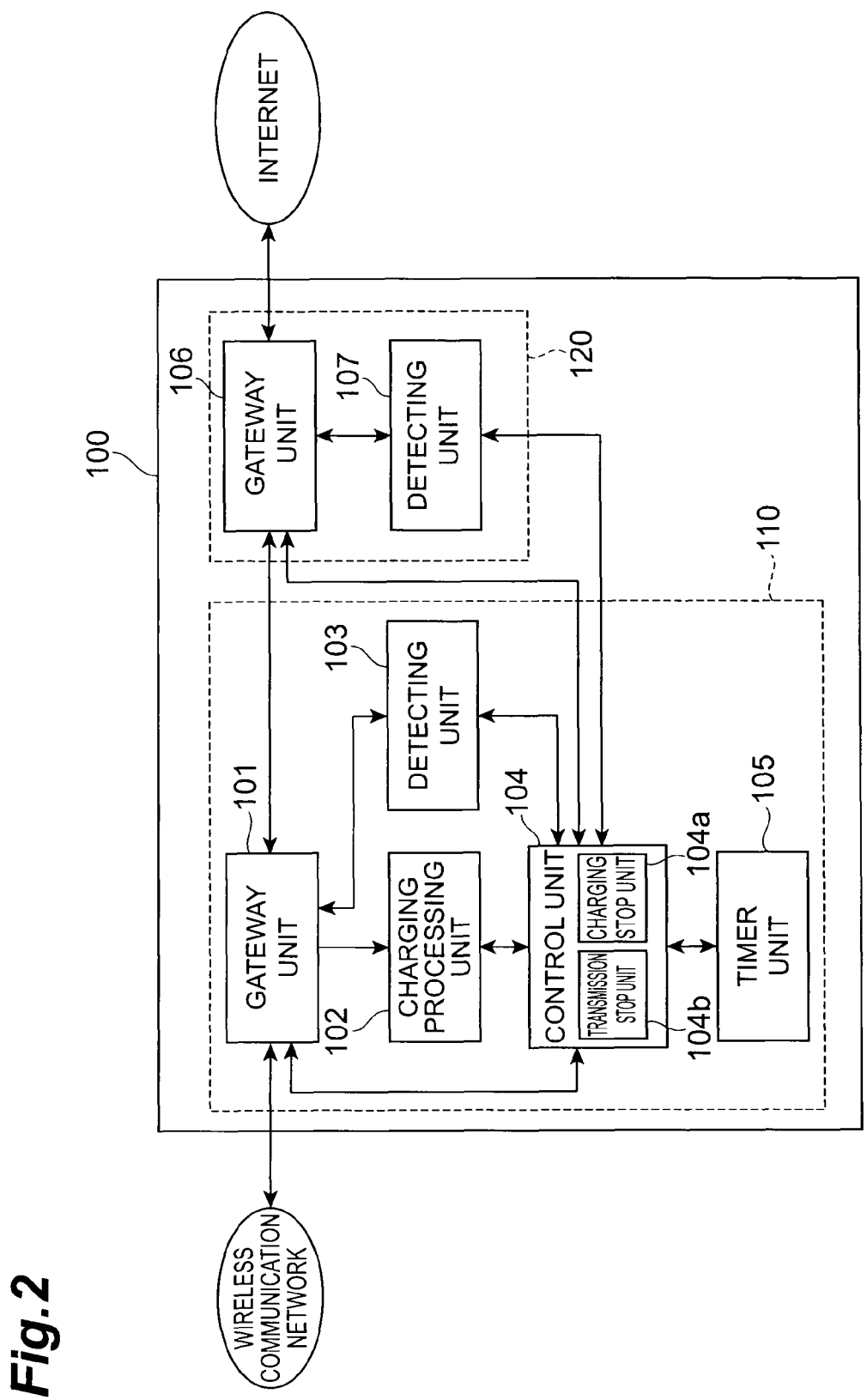
FIG. 2 is a block diagram illustrating the function of the proxy apparatus 100.

The structure of the proxy apparatus 100 performing the above-mentioned process will be described below. FIG. 2 is a block diagram illustrating the function of the proxy apparatus 100. The proxy apparatus 100 includes two gateway devices 110 and 120. The gateway device 110 mainly performs a charging process and a protocol switching process, and the gateway device 120 is a device for connection to an external network such as the Internet. The proxy apparatus 100 may not include the gateway devices 110 and 120, but may include a single gateway device.

Figure 3:
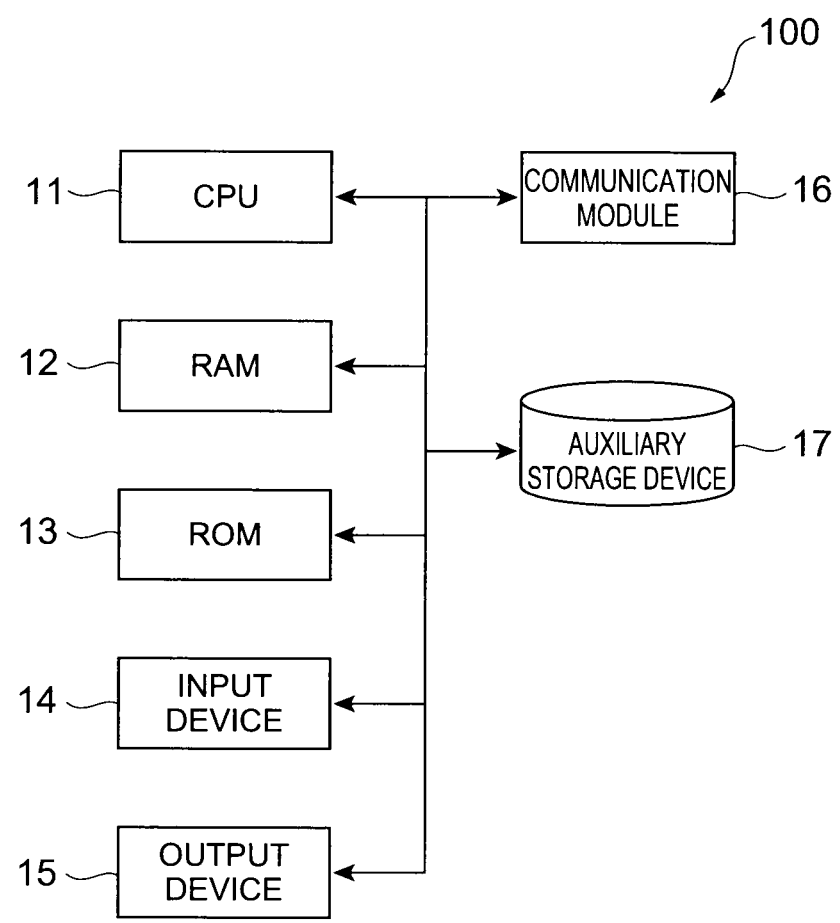
FIG. 3 is a diagram illustrating the hardware structure of a gateway device 110.

The gateway device 110 includes a gateway unit 101 (transmitting means), a charging processing unit 102 (charging means), a detecting unit 103, a control unit 104 (charging stop unit 104a: a charging stop means; and a transmission stop unit 104b: a transmission stop means), and a timer unit 105 (measuring means). The gateway device 110 is implemented by hardware shown in FIG. 3. FIG. 3 is a diagram illustrating the hardware structure of the gateway device 110. As shown in FIG. 3, the gateway device 110 shown in FIG. 2 is physically configured as a computer system including a CPU 11, a RAM 12 and a ROM 13, which are main storage devices, an input device 14 including, for example, a keyboard and a mouse, which are input devices, an output device 15, such as a display, a communication module 16, which is a data transmitting/receiving device, such as a network card, and an auxiliary storage device 17 such as a hard disk. The functions shown in FIG. 2 are implemented by reading predetermined computer software onto hardware, such as the CPU 11 and the RAM 12 shown in FIG. 3, such that the CPU 11 controls the operations of the input device 14, the output device 15, and the communication module 16 and reading and writing data from and to the RAM 12 or the auxiliary storage device 17. Next, each functional block will be described with reference to the functional blocks shown in FIG. 2.

The gateway unit 101 is for connecting the mobile apparatus 300 and the server 400. When communication connection is performed, the gateway unit 101 ensures a port in association with the mobile apparatus 300 and manages the association. In addition, the gateway unit 101 receives data transmitted from the gateway device 120 (server 400) through the port and transmits the data to the mobile apparatus 300 (wireless communication network). The gateway unit 101 receives data transmitted from the mobile apparatus 300 and transmits the data to the gateway device 120 (server 400).

The charging processing unit 102 counts the amount of data transmitted from the gateway unit 101 to the mobile apparatus 300 or the server 400 and performs a charging process corresponding to the count value.

The detecting unit 103 functionally detects response data that is transmitted from the server 400 in response to the data transmitted from the mobile apparatus 300 to the server 400, or response data that is transmitted from the mobile apparatus 300 in response to the data transmitted from the server 400 to the mobile apparatus 300 and detects a port through which upstream data or downstream data is received. When detecting the response data, that is, upstream data or downstream data on each port, the detecting unit 103 notifies the control unit 104 of information about the port through which the data is received or information indicating whether there is upstream data or downstream data.

The control unit 104 includes the charging stop unit 104a and the transmission stop unit 104b. The charging stop unit 104a performs control so as to stop the charging process of the charging processing unit 102, and the transmission stop unit 104b performs control so as to stop the transmission process of the gateway unit 101 and the gateway unit 106. When receiving a notice indicating that the response data from the detecting unit 103 has been detected, that is, when receiving a notice about the port through which communication is performed and a notice indicating that the upstream data or the downstream data has been detected, the control unit 104 resets the time for which communication is not performed, which is managed by the timer unit 105, and controls the timer unit 105 to measure the time again. When the detecting unit 103 does not detect the response data (that is, the upstream data or the downstream data) transmitted from the mobile apparatus 300 or the server 400 through one port within a predetermined period of time, the control unit 104 (charging stop unit 104a) controls the charging processing unit 102 to stop the charging process for the mobile apparatus 300 that ensures the one port. In addition, the control unit 104 (transmission stop unit 104b) instructs the gateway device 110 and the gateway device 120 to perform a process of closing a receiving port such that data transmitted from the mobile apparatus 300 or the server 400 is not received.

For example, when the time for which upstream communication is not performed (upstream non-communication time) for the port ensured by the mobile apparatus 300 is more than a predetermined time, the control unit 104 stops the charging process and closes all of the ports of the gateway device 120 (gateway unit 106) ensured by the mobile apparatus 300. When the time for which downstream communication is not performed (downstream non-communication time) for one of the ensured ports is more than a predetermined time, the control unit 104 stops the charging process and closes the one port of the gateway device 110 (gateway unit 101). Alternatively, the gateway device 110 or the gateway device 120 may close the ports according to whether data is transmitted in the upward or downward direction. In this case, it is possible to reduce the communication distance of data and the amount of traffic. For example, during the relay of upstream data, a port for the mobile apparatus 300 of the gateway device 110 is closed. When the ports of one of the gateway unit 110 and the gateway unit 120 are closed, communication paths that are constructed using the ensured ports of the gateway unit 110 and the gateway unit 120 do not perform their functions. Therefore, the ports of one of the gateway unit 110 and the gateway unit 120 may be closed. In this case, the charging process is not performed after the ports are closed.

During this process, when the gateway unit 101 or the gateway unit 106 receives a connection request from the mobile apparatus 300 or the server 400, the control unit 104 controls the gateway unit 101 and the gateway unit 106 to ensure a port for communication.

The control unit 104 may determine the transmission direction of data transmitted to or received from the gateway unit 101 and the gateway unit 106 on the basis of the notice from the detecting unit 103. After the port is ensured, the control unit 104 may determine whether the received data is upstream data or downstream data on the basis of the source address and destination address of the received data. The control unit 104 resets one of the timer value of the upstream non-communication time and the timer value of the downstream non-communication time, which are measured by the timer unit 105, on the basis of the notice, and controls the timer unit 105 to perform the time measuring process again. For example, when receiving a notice indicating that upstream data has been received, the control unit 104 resets the timer value of the upstream non-communication time and controls the timer unit 105 to measure the time from an initial value.

The timer unit 105 manages the upstream non-communication time for each mobile apparatus and manages the downstream non-communication time for each port. For example, when data is transmitted from the gateway unit 101 to the mobile apparatus 300, the timer unit 105 starts a process of measuring the time using the timer. When the gateway unit 101 receives response data from the mobile apparatus 300, the timer unit 105 resets the time measuring process and performs the time measuring process again. When it is determined that the response data from the mobile apparatus 300 within a predetermined period of time is not received on the basis of the time measuring process performed by the timer unit 105, the control unit 104 performs a process of closing the receiving port of the gateway device 120 (gateway unit 106), as described above.

Next, the timer unit 105 will be described in more detail. The timer unit 105 manages the upstream non-communication time, which indicates the time for which response data to the data transmitted from the server 400 to the mobile apparatus 300 is not detected, for each mobile apparatus 300 and manages the downstream non-communication time, which indicates the time for which response data transmitted from the server 400 is not detected, for each port ensured when the mobile apparatus 300 performs communication. FIG. 4 is a diagram illustrating the timer management of the timer unit 105. As shown in FIG. 4, a user indicating the mobile apparatus 300, the port used by the user, the upstream non-communication time which indicates the time for which response data from the mobile apparatus 300 is not detected, and the downstream non-communication time which indicates the time for which response data from the server 400 is not detected are stored in the timer unit 105 so as to be associated with each other. The timer unit 105 manages the upstream non-communication time for each user, that is, for each mobile apparatus 300, not for each port, and manages the downstream non-communication time for each port. This is because the upstream non-communication time is managed for the mobile apparatus and a communication failure does not occur for each port. That is, when the mobile apparatus is moved outside a communication service area, a communication failure occurs in all of the ports. The downstream non-communication time is managed for a communication partner, such as each content server connected to each port. In this case, a communication failure is likely to occur in each port. Therefore, the timer unit 105 manages the time for which communication is not performed for each port.

The timer unit 105 performs the timer management shown in FIG. 4. However, when the response data is not detected within 60 seconds after the time measuring process starts, the control unit 104 closes the port that is timed out. In the example shown in FIG. 4, since the downstream non-communication time for a port D of user 1 is more than 60 seconds, the control unit 104 controls the gateway unit 101 to close the port D. When there is a user with a port through which upstream communication is not performed for more than 60 seconds, the control unit 104 controls the gateway unit 106 to close all of the ports used by the user.

Next, the gateway device 120 will be described. The gateway device 120 includes the gateway unit 106 and a detecting unit 107.

The gateway device 120 connects the gateway device 110 and the server 400 arranged on the Internet. The gateway device 120 transmits data received from the server 400 to the gateway device 110 and transmits data received from the gateway device 110 to the server 400.

The detecting unit 107 detects the presence or absence of data transmitted from the gateway unit 106. When data is transmitted from the server 400 to the mobile apparatus 300, that is, when data is transmitted in the downward direction, the detecting unit 107 detects the presence or absence of response data from the mobile apparatus 300. When detecting that the response data is input from the gateway device 110 (mobile apparatus 300) to the gateway unit 106, the detecting unit 107 outputs information indicating the detection of the response data to the control unit 104. The detecting unit 107 functionally performs the same process as the detecting unit 103.

When the control unit 104 does not receive a notice indicating that the response data has been detected within a predetermined period of time set by the timer unit 105 from the detecting unit 107, the control unit 104 determines that data does not normally reach the mobile apparatus 300, for example, that the mobile apparatus 300 has moved outside the communication service area, and controls the charging processing unit 102 to stop the charging process. In addition, the control unit 104 controls the gateway unit 106 to close the receiving port such that data from the server 400 is not received.

Figure 5:
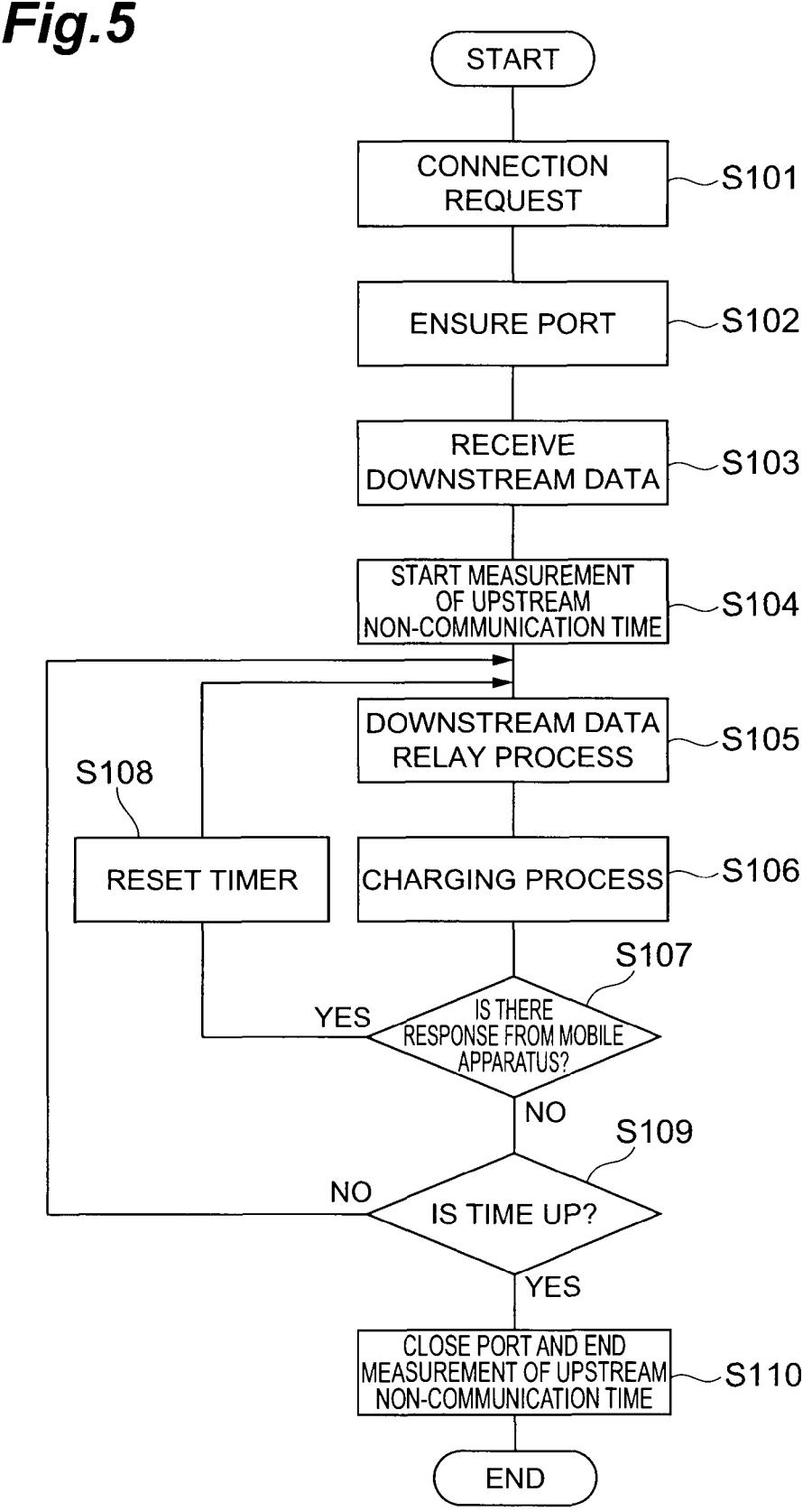
FIG. 5 is a flowchart illustrating the schematic operation of the proxy apparatus 100 when data is transmitted in the downward direction.

Next, the operation of the proxy apparatus 100 having the above-mentioned structure will be described. FIG. 5 is a flowchart illustrating the schematic operation of the proxy apparatus 100 when data is transmitted in the downward direction.

When the mobile apparatus 300 requests the server 400 to download content (S101), for example, when the mobile apparatus 300 transmits a content download request to the server 400 (this is available during the reproduction of streaming), an application is connected to the gateway unit according to a protocol, such as UDP. Therefore, the gateway units 101 and 106 of the proxy apparatus 100 ensure ports for connecting the mobile apparatus 300 and the server 400 (S102). When the port ensuring process is performed, the server 400 transmits data to the mobile apparatus 300, and the gateway units 106 and the gateway unit 101 receive the data (S103). In the proxy apparatus 100, when data is received, the timer unit 105 starts a process of measuring the time for which upstream communication is not performed in the mobile apparatus 300 (S104).

The received data is sequentially relayed to the server 400 by the gateway units 101 and 106 (S105). When the gateway unit 101 performs the relay process, the charging processing unit 102 performs a charging process according to the amount of data (S106).

The control unit 104 determines whether the gateway unit 106 receives response data from the mobile apparatus 300 on the basis of the detection result of the detecting unit 107 (S107). When downloading content data, the mobile apparatus 300 (that is, an application in the mobile apparatus) transmits response data for notifying that data is periodically downloaded to the server 400. When the detecting unit 107 detects the response data within a predetermined period of time, the timer value of the timer unit 105 is reset (S108), and the timer unit 105 starts the time measuring process from the initial value. Then, the process of receiving data transmitted in the downward direction, the transmission process, and the charging process are performed again. When the response data is not received within a predetermined period of time (S109:YES), the port of the gateway unit 106 is closed and the timer unit 105 stops the process of measuring the time for which upstream communication is not performed. In addition, the charging process stops (S110).

As such, when data is transmitted in the downward direction, a detection point of the detecting unit 107 set in the device that closes the port, that is, the gateway unit 106 detects the presence or absence of response data. When the gateway unit 106 does not detect the response data at the detection point, the charging process stops and the port of the gateway unit 106 that receives data from the server 400 is closed. In this way, it is possible to appropriately charge for data transmitted according to the connectionless protocol. That is, when the mobile apparatus 300 is moved outside the communication service area and data does not reach the mobile apparatus 300, it is possible to prevent the charging process from being performed.

Figure 6:
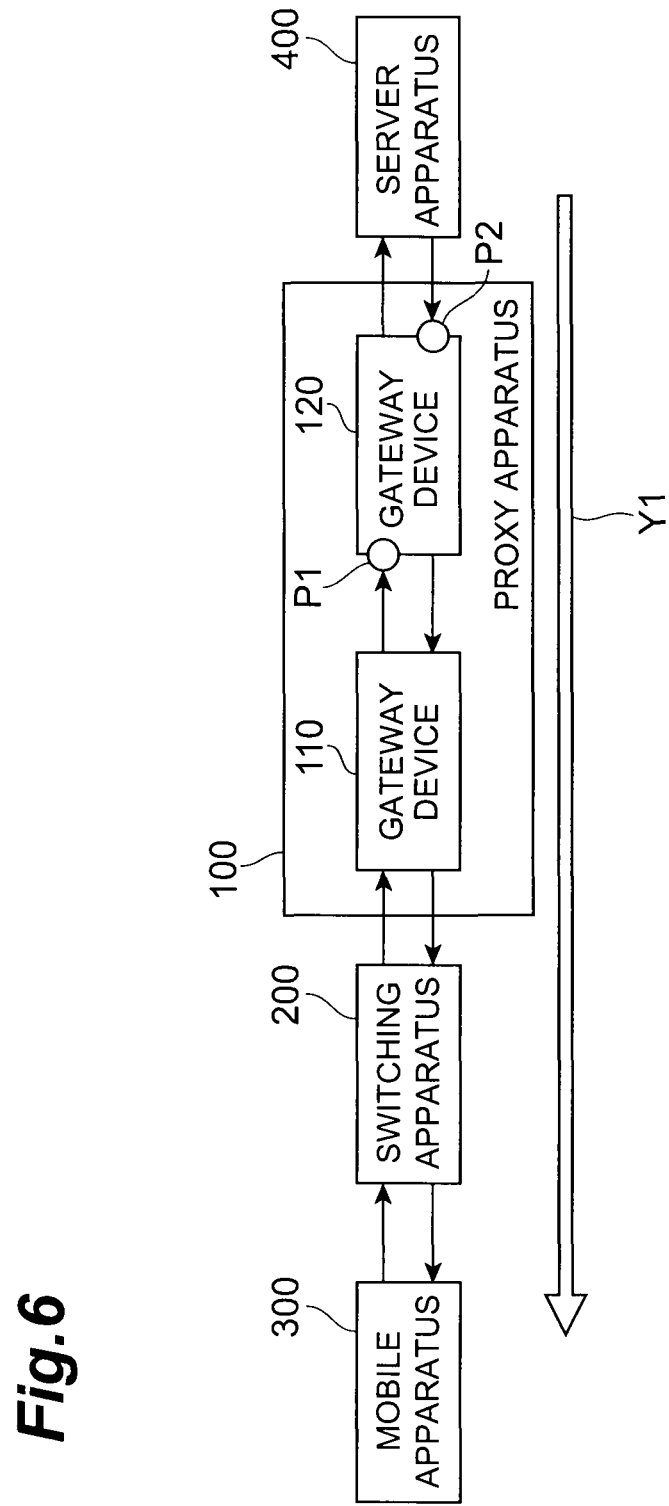
FIG. 6 is a diagram schematically illustrating the relationship between a charging processing point and a detection point of response data from a mobile apparatus 300.

The relationship between a charging processing point and the detection point of the response data from the mobile apparatus 300 will be described below. FIG. 6 is a diagram schematically illustrating the relationship.

As shown in FIG. 6, data is transmitted from the server 400 to the mobile apparatus 300 in the direction of an arrow Y1. The data transmitted from the server 400 is transmitted according to a connectionless protocol, such as UDP. Therefore, the gateway device 110, which is a charging processing point, performs the charging process when the mobile apparatus 300 is within the communication service area or outside the communication service area.

When the mobile apparatus 300 is within the communication service area, the mobile apparatus 300 may receive data normally. Therefore, the mobile apparatus 300 may generate response data to the received data and transmit the response data. On the other hand, when the mobile apparatus 300 is outside the communication service area, the mobile apparatus 300 cannot normally receive data. Therefore, the mobile apparatus 300 cannot recognize data, and the mobile apparatus 300 does not generate response data. In addition, since the mobile apparatus 300 is outside the communication service area, the mobile apparatus 300 does not transmit response data to the data.

Therefore, in this case, the proxy apparatus 100 does not receive the response data. In this embodiment, at a data detection point P1, when the gateway device 120 (detecting unit 107) does not detect the response data from the mobile apparatus 300 within a predetermined period of time, it is possible to determine that the mobile apparatus 300 does not receive the response data since the mobile apparatus 300 is outside the communication service area. In this case, the control unit 104 does not receive a notice indicating that the response data has been detected within a predetermined period of time from the detecting unit 107. Therefore, the control unit 104 controls the charging processing unit 102 to stop the charging process and controls the gateway unit 106 to close the receiving port for receiving data from the server 400. In FIG. 6, the port represented by a close point P2 is closed. In this way, since no data is transmitted from the proxy apparatus 100 to a network on the downstream side (on the side of the mobile apparatus 300), the charging process is not performed. Since data is not used, the charging process for data is not needed.

As in this embodiment, if the gateway device 120 is constructed to include the data detection point P1 and the close point P2, the occurrence of time lag is significantly reduced since the process is performed in the same device and it is possible to effectively prevent an unnecessary charging process.

Figure 7:
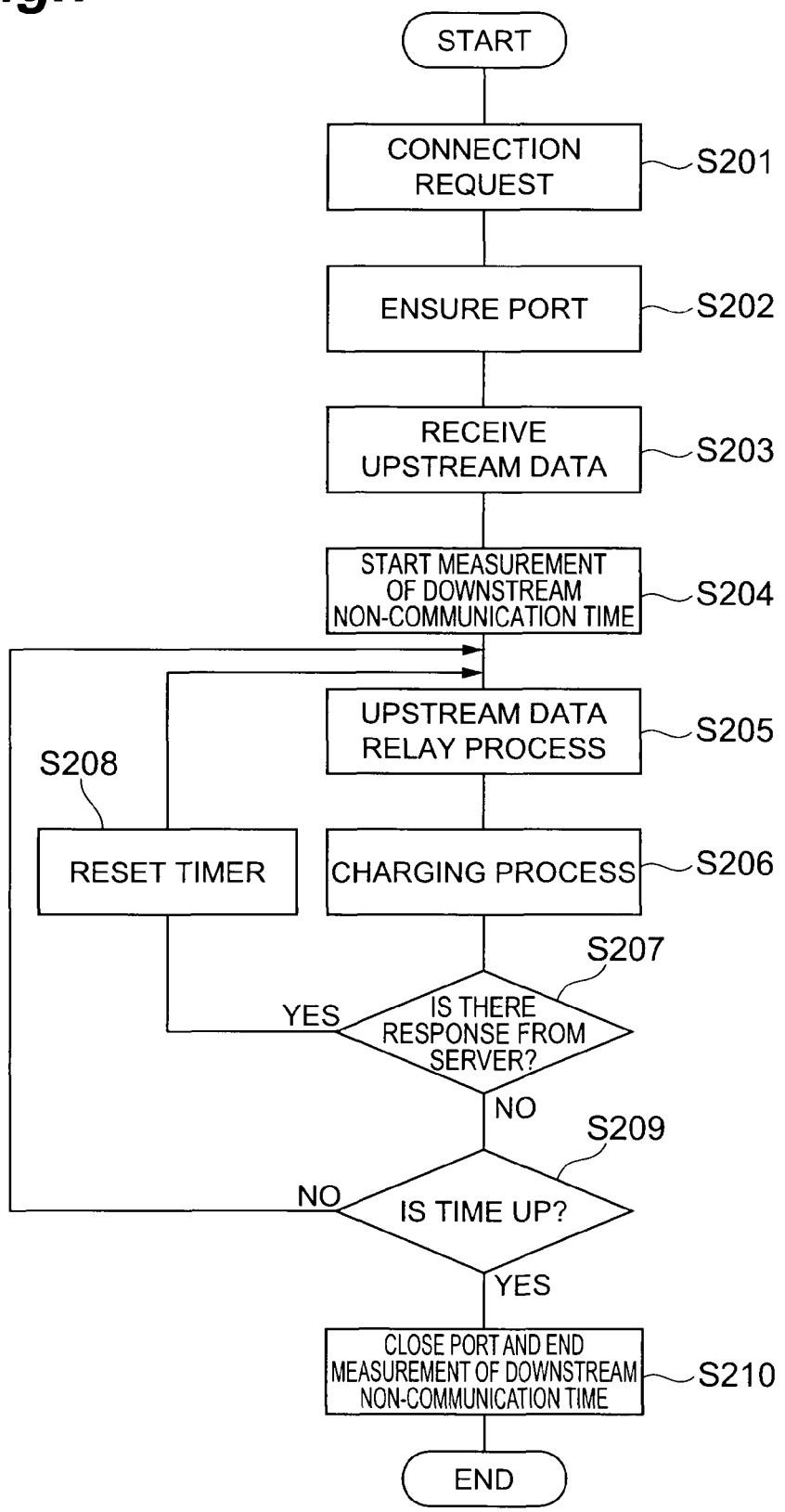
FIG. 7 is a flowchart illustrating the schematic operation of the proxy apparatus 100 when data is transmitted in the upward direction.

Next, the operation of the proxy apparatus 100 when data is transmitted in the upward direction will be described. FIG. 7 is a flowchart illustrating the schematic operation of the proxy apparatus 100 when data is transmitted in the upward direction. In FIG. 7, data is transmitted to the server 400, but the invention is not limited thereto. For example, data may be transmitted to a terminal, such as a mobile apparatus, through the server 400.

When the mobile apparatus 300 requests the server 400 to upload data (for example, contribution data) (S201), for example, when the mobile apparatus 300 transmits a content upload request to the server 400, an application is connected to the gateway unit according to a protocol, such as UDP. Therefore, the gateway units 101 and 106 of the proxy apparatus 100 ensure ports for connecting the mobile apparatus 300 and the server 400 (S202). When the port ensuring process is performed, the server 400 transmits data to the mobile apparatus 300, and the gateway units 106 and the gateway unit 101 receive the data (S203). In the proxy apparatus 100, when data is received, the timer unit 105 starts a process of measuring the downstream non-communication time in the mobile apparatus 300 (S204). The source address and the destination address are described in the header of the data, and the gateway unit 106 recognizes the source address. Therefore, the control unit 104 can recognize that data is downloaded, that is, data is transmitted in the downward direction.

The gateway units 101 and 106 sequentially relay the received data to the server 400 (S205). When the gateway unit 101 performs the relay process, the charging processing unit 102 performs a charging process corresponding to the amount of data (S206).

The control unit 104 determines whether the gateway unit 101 receives the response data from the server 400 on the basis of the detection result of the detecting unit 107 (S207). When the response data is detected within a predetermined period of time, the count value of the timer unit 105 is reset (S208), and the timer unit 105 starts a time measuring process from an initial value. Then, the process of receiving data transmitted in the upward direction, the transmission process, and the charging process are performed again. When the response data is not received within a predetermined period of time (S209: YES), the port of the gateway unit 101 is closed and the timer unit 105 stops the process of measuring the downstream non-communication time. In addition, the charging process stops (S210).

As such, when data is transmitted in the upward direction, a detection point set in the device that closes the port, that is, the gateway unit 101 detects the presence or absence of response data. When the gateway unit 101 detects the response data at the detection point, the charging process stops and the port of the gateway unit 101 that receives data from the mobile apparatus 300 is closed. In this way, it is possible to appropriately charge for data transmitted according to the connectionless protocol. That is, when data does not reach the server 400, for example, when the server 400 does not receive data due to, for example, a failure, it is possible to prevent the charging process from being performed.

Figure 8:
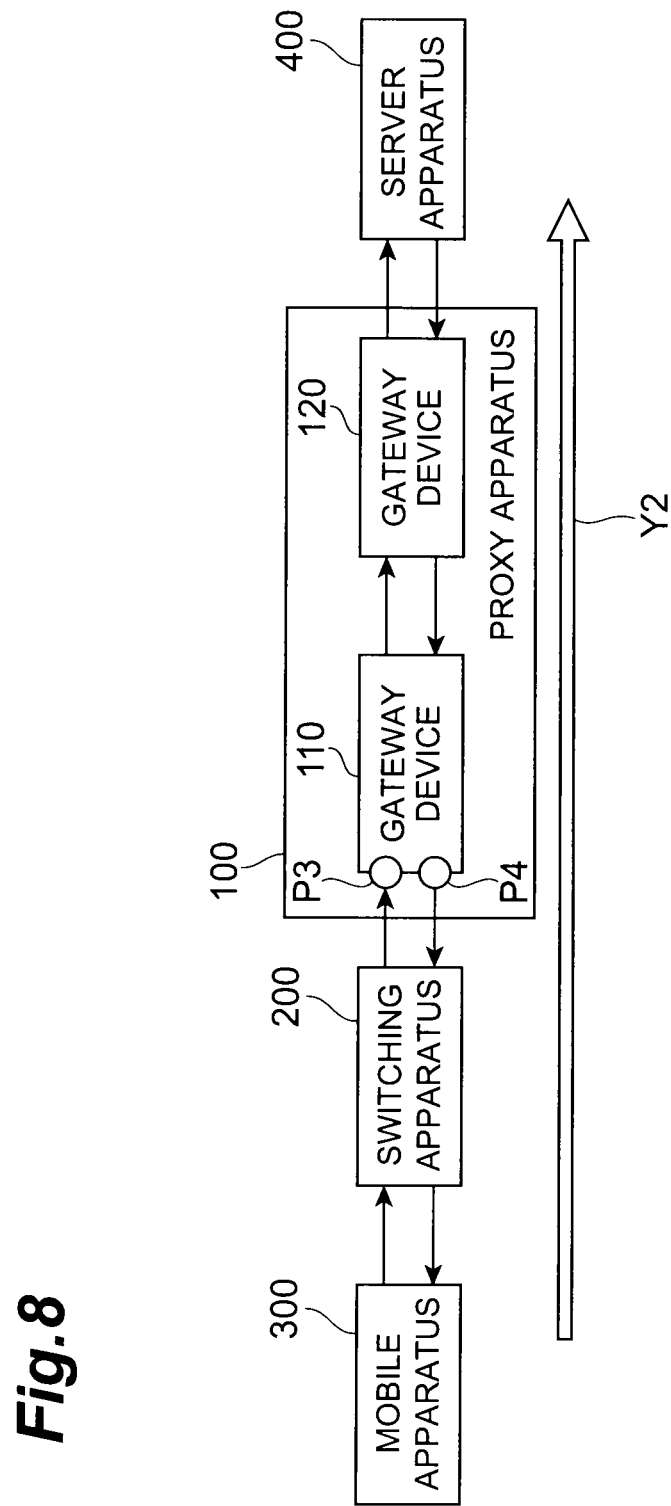
FIG. 8 is a diagram schematically illustrating the relationship between a charging processing point and a detection point of response data from a server 400.

The relationship between a charging processing point and the detection point of the response data from the server 400 will be described below. FIG. 8 is a diagram schematically illustrating the relationship.

As shown in FIG. 8, data is transmitted from the mobile apparatus 300 to the server 400 in the direction of an arrow Y2. The data transmitted from the server 400 is transmitted according to the connectionless protocol, such as UDP. Therefore, the gateway device 110, which is a charging processing point, performs the charging process regardless of whether the server 400 can perform communication.

When the server 400 is in a normal state, the server 400 can normally receive data. Therefore, the server 400 can generate response data to the received data and transmit the response data. On the other hand, when the server 400 does not perform communication due to, for example, a failure, the server 400 does not normally receive data. Therefore, the server 400 cannot obtain a trigger for generating the response data. In addition, since communication is not available, the server 400 does not transmit the response data.

Therefore, in this case, the proxy apparatus 100 does not receive the response data. In this embodiment, at a data detection point P4, when the gateway device 110 (detecting unit 103) does not detect the response data from the server 400 within a predetermined period of time, it is possible to determine that the server 400 does not receive the response data due to, for example, a failure. In this case, the control unit 104 does not receive a notice indicating that the response data has been detected within a predetermined period of time from the detecting unit 107. Therefore, the control unit 104 controls the charging processing unit 102 to stop the charging process and controls the gateway unit 101 to close the receiving port for receiving data from the mobile apparatus 300. In FIG. 8, the port represented by a close point P3 is closed. In this way, since data does not pass through the proxy apparatus 100, the charging process is not performed.

As in this embodiment, when the gateway device 110 includes the data detection point P4 and the close point P3, the occurrence of time lag is significantly reduced since the process is performed in the same device and it is possible to effectively prevent an unnecessary charging process.

Figure 9:
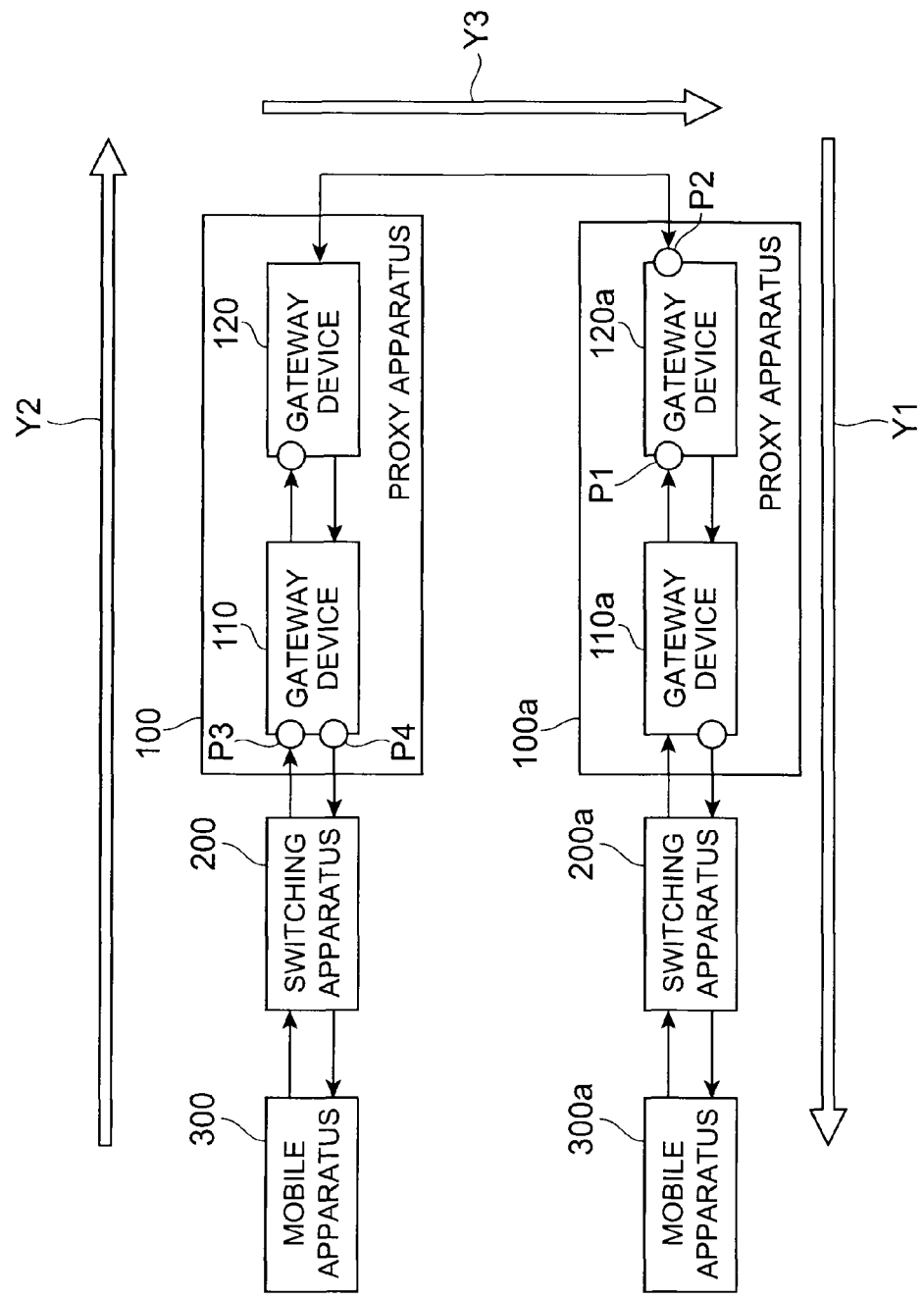
FIG. 9 is a diagram illustrating the schematic operation of the proxy apparatuses 100 and 100a when the mobile apparatus 300 and a mobile apparatus 300a communicate with each other.

Next, the operation of the proxy apparatuses 100 and 100a when the mobile apparatus 300 communicates one to one with a mobile apparatus 300a having the same function as the mobile apparatus 300 will be described with reference to FIG. 9. FIG. 9 is a diagram illustrating the schematic operation of the proxy apparatuses when the mobile apparatus 300 communicates one to one with the mobile apparatus 300a. The proxy apparatus 100 and the proxy apparatus 100a have the same structure. The proxy apparatus 100 manages the upstream non-communication state to upstream data (data transmitted in the direction of the arrow Y2) and the proxy apparatus 100a manages the downstream non-communication state (data transmitted in the direction of the arrow Y1). As described above, this embodiment is not limited to the above-mentioned one-to-one communication, but may be applied to one-to-N communication.

First, the proxy apparatus 100 receives a connection request from the mobile apparatus 300 according to the process shown in FIG. 7. When a port is ensured, a process of relaying upstream data to the mobile apparatus 300a and a process of charging for data transmitted from the mobile apparatus 300 are performed (arrow Y2: S201 to S206 in FIG. 7).

Then, when receiving data from the proxy apparatus 100 (arrow Y3), the proxy apparatus 100a performs a data relay process and a process of charging for data transmitted from the mobile apparatus 300a (arrow Y1: S103 to S106 in FIG. 5).

In the proxy apparatus 100, the presence or absence of response data from the mobile apparatus 300a is detected at a downstream data detection point P4 that is set in the gateway device 110. When the response data is not detected within a predetermined period of time, it may be determined that the mobile apparatus 300a does not perform communication since the mobile apparatus 300a is outside the communication service area. The gateway device 110 stops a charging process for the mobile apparatus 300 and closes the port at the close point P3.

The proxy apparatus 100a detects the presence or absence of the response data from the mobile apparatus 300a. When the proxy apparatus 100*a* does not detect the response data within a predetermined period of time, it may be determined that the mobile apparatus 300*a* does not perform communication since the mobile apparatus 300*a* is outside the communication service area. The gateway device 110*a* stops a charging process for the mobile apparatus 300*a* and closes the port at the close point P2 set in the gateway device 120*a*.

Figure 10:
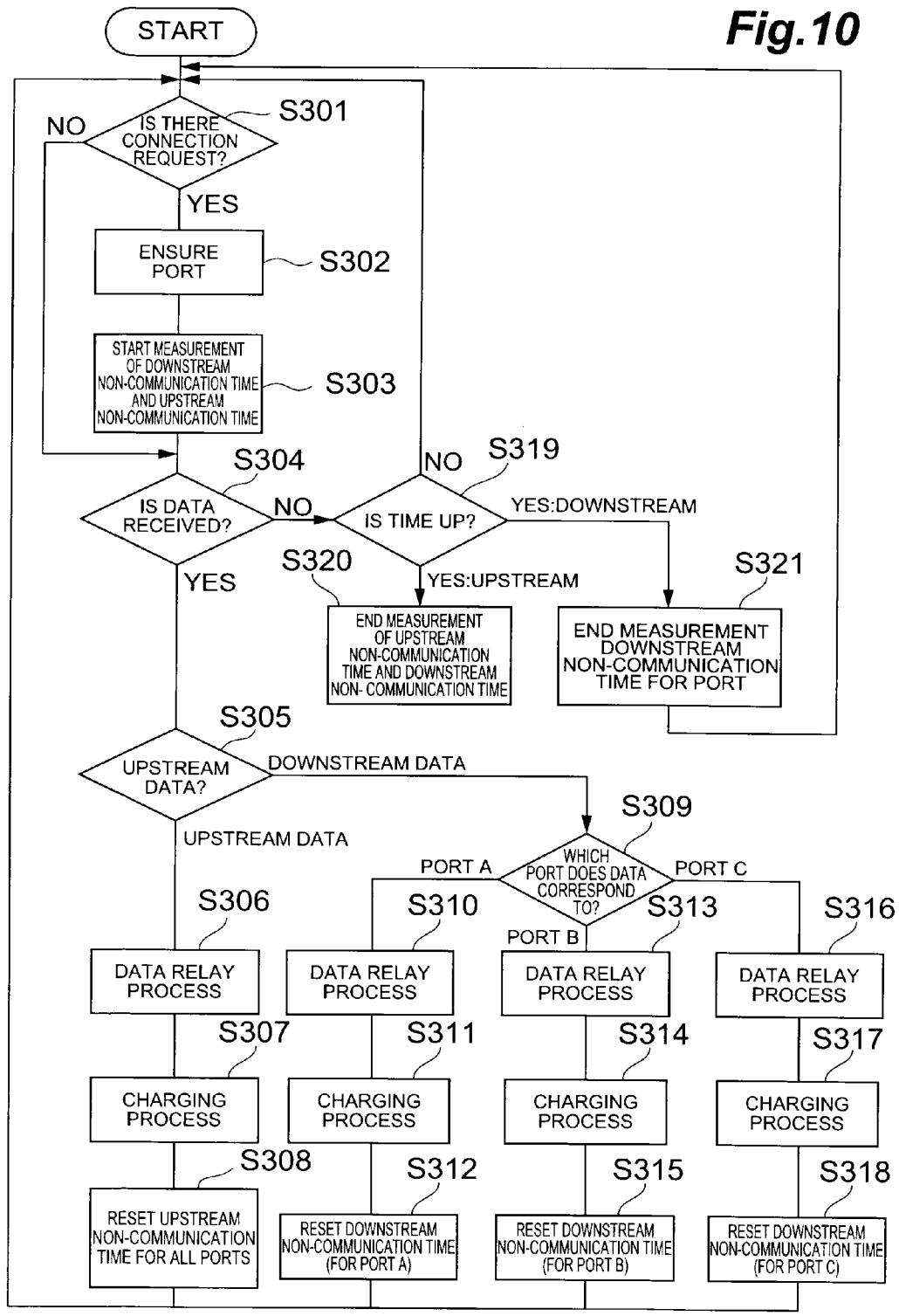
FIG. 10 is a flowchart illustrating the detailed process of the proxy apparatus 100 according to this embodiment.

Next, the detailed process of the proxy apparatus 100 according to this embodiment will be described. FIG. 10 is a flowchart illustrating the detailed process of the proxy apparatus 100 according to this embodiment. While FIG. 5 or 7 shows the schematic process for data transmitted in the upward direction or the downward direction, FIG. 10 shows the details of a process corresponding to the management of the timer set for each port, upstream data, and downstream data.

When the proxy apparatus 100 receives a connection request from the mobile apparatus 300 (S301), each of the gateway unit 101 and the gateway unit 106 performs a process of ensuring a port (S302). When there are a connection request and a communication request, the port ensuring process is performed for each request. Then, the timer unit 105 starts a process of measuring the time for which upstream/downstream communication is not performed through the port (S303). Specifically, as shown in FIG. 4, the timer unit 105 measures the upstream non-communication time through each of the ensured ports and the downstream non-communication time through each of the ensured ports, and manages the times.

When data is received from the mobile apparatus 300 or the server 400 (S304), the control unit 104 determines whether the data is upstream data (S305). If the data is determined to be upstream data (S305: upstream data), the gateway units 101 and 106 perform a data relay process (S306), and the charging processing unit 102 performs a charging process corresponding to the amount of relayed data (S307). Then, the control unit 104 resets the timer value of the upstream non-communication time for all ports among the timer values measured by the timer unit 105 and controls the timer unit 105 to measure the time for which communication is not performed from an initial value again (S308).

In S305, when the control unit 104 determines the data to be downstream data (S305: downstream data), the control unit 104 determines the port through which the data is transmitted (S309). If it is determined that downstream data is transmitted through a port A (S309: port A), a data relay process (S310), a charging process (S311), and a process (S312) of resetting a timer value corresponding to the port A in the time for which downstream communication is not performed and starting the time measuring process again are performed.

When the control unit 104 determines that the data is downstream data through a port B (S309: port B), a data relay process (S313), a charging process (S314), and a process (S315) of resetting a timer value corresponding to the port B in the downstream non-communication time and starting the time measuring process again are performed.

When the control unit 104 determines that the data is downstream data through a port C (S309: port C), a data relay process (S316), a charging process (S317), and a process (S318) of resetting a timer value corresponding to the port C in the downstream non-communication time and starting the time measuring process again are performed.

In S304, when the gateway unit 101 or the gateway unit 106 does not receive the upstream data or the downstream data and any one of the timer values corresponding to the times for which upstream communication and downstream communication are not performed through each port, which are measured by the timer unit 105, is elapsed (S319), the timer unit 105 ends the process of measuring the time for which communication is not performed, which is elapsed, and the control unit 104 stops the charging process and performs a port closing process. That is, when the upstream non-communication time is elapsed, the timer unit 105 ends the process of measuring the upstream/downstream non-communication time (S320) and the control unit 104 controls the charging processing unit 102 to perform the charging process and controls the gateway unit 101 to close the port corresponding to the mobile apparatus 300. When the upstream non-communication time is elapsed, the timer unit 105 ends the process of measuring the time for which communication is not performed through the port, which is elapsed, and the control unit 104 controls the charging processing unit 102 to perform the charging process and controls the gateway unit 106 to close the port corresponding to the server 400 (S321).

Next, the operation and effect of the proxy apparatus 100 according to this embodiment will be described. In the proxy apparatus 100 according to this embodiment, the gateway unit 101 and the gateway unit 106 send data transmitted between the mobile apparatus 300 and the server 400 to the mobile apparatus 300 or the server 400, which is a transmission destination, and the charging processing unit 102 performs a charging process according to the amount of data transmitted by the gateway unit 101 and the gateway unit 106. The detecting unit 103 detects whether response data is transmitted from the transmission destination while the charging process is performed. The detecting unit 103 detects data and determines whether the data is upstream data or downstream data. When the detecting unit 103 determines that upstream data or downstream data is received, the control unit 104 controls the timer unit 105 to reset the timer value of one of the upstream non-communication time for the port that receives data and the downstream non-communication time for the port that receives data.

When the timer value of the time (the non-communication time) for which communication is not performed is more than a predetermined time and the detecting unit 103 does not detect the response data from the transmission destination, the control unit 104 may stop the transmission process of the gateway unit 101 or the gateway unit 106. That is, the control unit 104 may control the gateway unit 101 or the gateway unit 106 to close the port. In addition, the control unit 104 may control the charging processing unit 102 to stop the charging process.

In this way, when communication is performed using a connectionless protocol, such as UDP, it is possible to recognize that the transmitter side and the receiver side can communicate with each other. In addition, only when the transmitter side and the receiver side are connected, it is possible to perform the charging process. Therefore, it is possible to achieve an appropriate charging process.

In the proxy apparatus 100 according to this embodiment, when response data is detected within a predetermined period of time after a transmission process starts, that is, when the time for which communication is not performed, which is measured by the timer unit 105, is more than a predetermined time, the ports of the gateway unit 101 and the gateway unit 106 are closed and the transmission process stops. In addition, the charging process stops. Therefore, it is possible to perform a process within a given time width and thus accurately recognize a connection state.

In the proxy apparatus 100 according to this embodiment, the control unit 104 manages the upstream non-communication time and the downstream non-communication time for each port using the timer unit 105. When the detecting unit 103 does not detect data transmitted from the mobile apparatus 300 in the upward direction, the control unit 104 controls the timer unit 105 to stop the process of measuring the upstream non-communication time for all ports and controls the charging processing unit 102 to stop the charging process. When the detecting unit 103 does not detect data transmitted from the server 400 in the downward direction, the control unit 104 controls the timer unit to stop the process of measuring the downstream non-communication time through the port connected to the server 400 and controls the charging processing unit 102 to stop the charging process.

Therefore, it is possible to perform a process corresponding to the ensured port. For example, the upstream non-communication time indicates the state between the mobile apparatus 300 and the proxy apparatus 100, and it is preferable to perform a stop process for all ports since the following situation does not occur in which the mobile apparatus 300 is outside the communication service area for only one port and the mobile apparatus 300 is within the communication service area for another port. In addition, the downstream non-communication time indicates the state between the proxy apparatus 100 and the server 400 connected to the proxy apparatus 100 through one port through which downstream communication is performed. In some cases, even though the server 400 connected through one port cannot perform communication due to, for example, a failure, the server may be connected through another port and perform communication. Therefore, in this case, management is performed such that a communication connection process and a charging process for the server connected through another port can be continuously performed.

The invention claimed is:

1. A data relay device comprising:
a transmitting means for transmitting data from a mobile apparatus to a server or from the server to the mobile apparatus;
a charging processing means for performing a charging process according to the amount of data transmitted by the transmitting means;
a detecting means for detecting whether response data is transmitted from the transmission destination of the transmitting means;
a transmission stop means for stopping a transmission process of the transmitting means when the detecting means does not detect the response data from the transmission destination; and
a charging stop means for stopping the charging process of the charging processing means when the detecting means does not detect the response data from the transmission destination,
wherein, when the response data is not detected within a predetermined period of time after the transmitting means starts the transmission process, the transmission stop means stops the transmission process of the transmitting means, and
when the response data is not detected within the predetermined period of time after the transmitting means starts the transmission process, the charging stop means stops the charging process of the charging processing means,
the data relay device further comprising:
a measuring means for measuring upstream non-communication time which is the time for which the response data from the mobile apparatus is not detected, and downstream non-communication time which is the time for which the response data from the server is not detected, for each port,
wherein, when the detecting means does not detect the response data transmitted from the mobile apparatus through each port within the predetermined period of time, the measuring means stops a process of measuring the upstream non-communication time for all ports ensured by the mobile apparatus, the charging stop means stops the charging process of the charging processing means for data received through all ports after the predetermined period of time has elapsed, and the transmission stop means performs a process of closing all ports to stop the transmission process of the transmitting means,
and when the detecting means does not detect the response data transmitted from the server connected through one of all of the ensured ports within the predetermined period of time, the measuring means stops a process of measuring the downstream non-communication time for the one port, the charging stop means stops the charging process of the charging processing means for data received through the one port after the predetermined period of time has elapsed, and the transmission stop means performs a process of closing the one port to stop the transmission process of the transmitting means.

2. A data relay method comprising:
a transmitting step of transmitting data from a mobile apparatus to a server or from the server to the mobile apparatus;
a charging step of performing a charging process according to the amount of data transmitted in the transmitting step;
a detecting step of detecting whether response data is transmitted from the transmission destination in the transmitting step;
a transmission stop step of stopping a transmission process in the transmitting step when the response data from the transmission destination is not detected in the detecting step; and
a charging stop step of stopping the charging process in the charging step when the response data from the transmission destination is not detected in the detecting step;
wherein, when the response data is not detected within a predetermined period of time after starting the transmission process in the transmitting step, stopping the transmission process in the transmitting step, and
when the response data is not detected within the predetermined period of time after starting the transmission process in the transmitting step, stopping the charging process in the charging step,
the method further comprising:
a measuring step of measuring upstream non-communication time which is the time for which the response data from the mobile apparatus is not detected, and downstream non-communication time which is the time for which the response data from the server is not detected, for each port,
wherein, when the detecting step does not detect the response data transmitted from the mobile apparatus through each port within the predetermined period of time, stopping a process of measuring the upstream non-communication time for all ports ensured by the mobile apparatus, stopping the charging process of the charging step for data received through all ports after the predetermined period of time has elapsed, and performing a process of closing all ports to stop the transmission process of the transmitting step,
and when the detecting step does not detect the response data transmitted from the server connected through one of all of the ensured ports within the predetermined period of time, stopping a process of measuring the downstream non-communication time for the one port, stopping the charging process of the charging step for data received through the one port after the predetermined period of time has elapsed, and performing a process of closing the one port to stop the transmission process of the transmitting step.

3. A data relay device comprising:

a transmitter that transmits data from a mobile apparatus to a server or from the server to the mobile apparatus;

a charging processor that performs a charging process according to the amount of data transmitted by the transmitter;

a detector that detects whether response data is transmitted from the transmission destination of the transmitter;

a transmission stopper that stops a transmission process of the transmitter when the detector does not detect the response data from the transmission destination; and a charging stopper that stops the charging process of the charging processor when the detector does not detect the response data from the transmission destination, wherein, when the response data is not detected within a predetermined period of time after the transmitter starts the transmission process, the transmission stopper stops the transmission process of the transmitter, and when the response data is not detected within the predetermined period of time after the transmitter starts the transmission process, the charging stopper stops the charging process of the charging processor, the data relay device further comprising:

a measuring device that measures upstream non-communication time which is the time for which the response data from the mobile apparatus is not detected, and downstream non-communication time which is the time for which the response data from the server is not detected, for each port, wherein, when the detector does not detect the response data transmitted from the mobile apparatus through each port within the predetermined period of time, the measuring device stops a process of measuring the upstream non-communication time for all ports ensured by the mobile apparatus, the charging stopper stops the charging process of the charging processor for data received through all ports after the predetermined period of time has elapsed, and the transmission stopper performs a process of closing all ports to stop the transmission process of the transmitter, and when the detector does not detect the response data transmitted from the server connected through one of all of the ensured ports within the predetermined period of time, the measuring device stops a process of measuring the downstream non-communication time for the one port, the charging stopper stops the charging process of the charging processor for data received through the one port after the predetermined period of time has elapsed, and the transmission stopper performs a process of closing the one port to stop the transmission process of the transmitter.

* * * * *